United States Patent Office 2,884,212
Patented Apr. 28, 1959

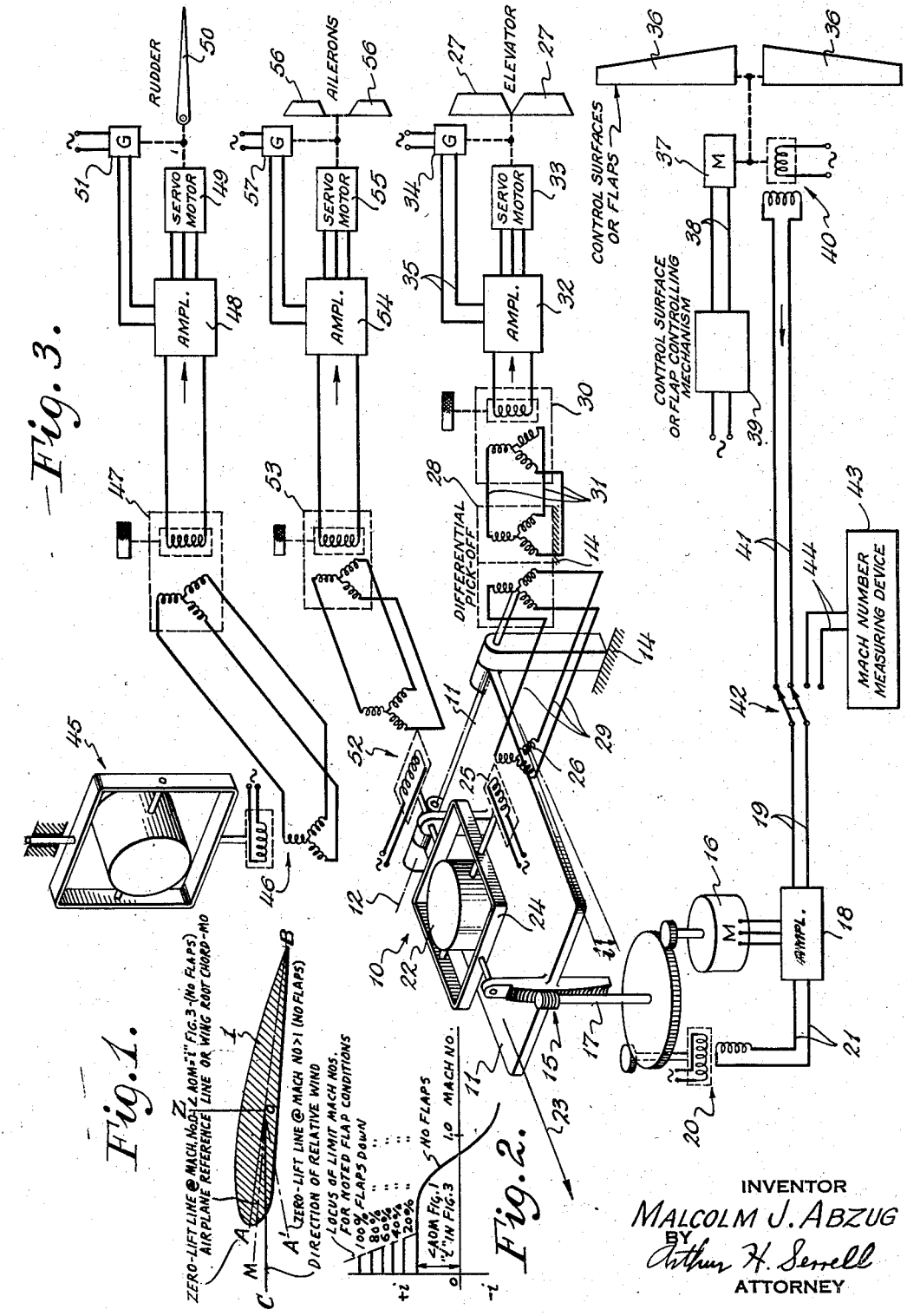

2,884,212

AIRCRAFT AUTOMATIC PILOT

Malcolm J. Abzug, Pacific Palisades, Calif., assignor to Sperry Rand Corporation, a corporation of Delaware Application November 30, 1953, Serial No. 395,081

10 Claims. (Cl. 244—77)

This invention relates to improvements in aircraft automatic pilots of the character shown in U.S. Letters Patent No. 2,553,546, issued May 22, 1951 to R. Brannin which provides a fixedly inclined gimbal type gyro vertical as a datum for controlling the altitude of the craft to prevent loss of altitude during turns.

The principle of the Brannin invention is to automatically increase the angle of attack of the craft during banked turns, so that the vertical lift remains constant and equal to the total weight of the craft. This is accomplished by control of the elevators of the craft from the pitch pick-off of a gyro vertical whose major or fore and aft directed axis is upwardly inclined in substantial parallelism with the line of zero-lift of the wing section of the craft. In the Brannin invention, the relation between the inclined gyro vertical and the wing root chord of the craft is fixed and the craft is operated during turns so as to keep its air speed substantially constant. Under such conditions, the automatic pilot operates to automatically increase the craft's angle of attack during turns in proportion to the secant of its banking angle. The fixed gyro vertical orientation disclosed in the noted Brannin patent provides the elevator deflection required for constant altitude turns up to moderate bank angles at relatively low air speeds.

In accordance with the present invention, I have provided an inclined gimbal type gyro vertical whose orientation relative to the wing root chord is adjusted in accordance with effective changes in the position of the zero-lift line during flight of the craft. Such reorientations are required due to the compressibility and aeroelasticity of the wing section of the craft during conditions of operation in the region where a Mach No. measuring instrument would read unity. Also, the proper orientation of the gyro vertical in a condition of flight with the flaps down or other like control surfaces effective is materially different from that required in customary flight with the flaps up or other like control surfaces of the craft ineffective.

The primary object of the present invention is to adjust the angle of orientation of the inclined gimbal gyro vertical to correspond to the orientation of the position of the line of zero-lift of the wing section of a craft and thus provide an automatic pilot elevator control that prevents loss in altitude during banked turns under any flight condition.

One of the objects of the present invention resides in so adjusting the gyro vertical stabilizing reference for an aircraft that a correct pitch signal will be derived from the pitch pick-off of said gyro vertical when roll movements of the craft from a straight and level attitude occur. More particularly, it is an object of this invention to vary the inclination or attitude of the axis of the gimbal ring of the gyro vertical, that is, the axis about which the roll pick-off is operable, in accordance with or preferably through an angle proportional to any angular variation in the inclination of the zero-lift line of the wing of the aircraft such as that represented in the drawings of this application as line A—B in Fig. 1 thereof.

When a craft is placed in a banked attitude, it necessarily follows that the vertical lift component becomes less thereby resulting in loss of altitude of the craft if prior to attaining this banked attitude the craft was flying straight and level at constant elevation. In accordance with the present invention, when the inclination of the zero-lift line above referred to is changed due, for example, to lowering of the flaps of the aircraft, the axis of the gimbal of the gyro vertical is tilted relative to the wing root chord of the aircraft in an angular amount proportional to the angular shift in attitude or inclination of the zero-lift line. Hence, under these circumstances, a pitch signal, compensated for changes in the inclination of the zero-lift line, will be developed when the craft is banked. The compensated pitch signal varies as a cosine function of the bank angle of the craft and is utilized to provide corrective up-elevator operation.

One of the features of the invention resides in the provision of a platform for supporting the controlling gyro vertical that is adjustable about an axis athwartship of the craft.

Another feature of the invention is in the provision of means for measuring the effective change in the position of the line of zero-lift of the wing section of the craft relative to the wing root chord and for utilizing such measurement to cause a corresponding adjustment in the inclination of the gimbal axis of the gyro vertical relative to the wing root chord indicated in Fig. 1 as line MO.

Still a further feature of the invention resides in the provision of a differential pick-off at the axis of the tilt platform of the improved automatic pilot.

Other features and structural details of the invention will be apparent from the following description when read in relation to the accompanying drawing, wherein, Fig. 1 shows a section of an airplane wing in flight;

Fig. 2 is a graph showing the relation between angle "$i$," flap position, and Mach No., and Fig. 3 is a schematic view and wiring diagram showing an automatic pilot constructed in accordance with the present inventive concepts.

In accordance with the present invention, Fig. 1 shows a root section of an airplane wing in which MO is the geometrical wing root chord or aircraft reference line and CO is the direction of the relative wind. The zero-lift line AOB in the wing section is parallel to the relative wind when the lift is zero. Then AOC is the angle referred to herein as the angle of attack and the lift of the wing is proportional to the angle of attack as thus defined. The direction of lift of the wing is shown by OZ which is perpendicular to the relative wind. To maintain the craft at a constant altitude, the vertical component of lift must be just equal to the gross weight of the craft. If the air speed of the craft is kept at a constant value, the total lift is proportional to the angle of attack. In accordance with the Brannin invention, a gyro vertical, fixedly oriented with respect to the wing root chord MO, automatically controlled the elevators of the craft to increase the angle of attack so as to prevent loss of altitude of the craft in turns as a function of the secant of the angle of bank of the craft. The present system is one that functions in the manner described with the angle ($i$) Fig. 3, adjusted to compensate for changes in the angle AOM, Fig. 1, under varying flight conditions.

With reference to Fig. 3, the improved automatic pilot includes a gyro vertical indicated at 10 that is mounted on a platform 11 tiltable about an axis 12 situated athwartship of the craft. A portion of the frame of the craft is generally designated at 14, the platform 11 being shown as pivoted at one end thereof relative to the craft by suitable mounting posts and bearing connections. The angle (*i*) designated in Fig. 3 corresponds with the angle AOM indicated in Fig. 1 which is the angle between the zero-lift line and the wing root chord MO of the craft. As shown, the platform 11 is positioned about its axis 12 at the defined angle (*i*) by adjustable means such as a gear and rack connection indicated at 15, the rack being formed as a part of platform 11 and the gear meshing therewith being operatively connected to a suitable motor 16 by way of conventional reduction gearing and shaft 17. Motor 16 is operated by the signal output of a suitable amplifier 18 whose input is provided by way of input leads 19. A conventional follow-up arrangement is provided to control the servo loop including motor 16. This arrangement, as shown, includes a repeatback signal generator 20 whose rotor is driven by shaft 17. The output of generator 20 is fed negatively to amplifier 18 by way of leads 21.

The gyro vertical parts of the improved automatic pilot include a rotor frame 22 whose major axis 23, as defined by gimbal ring 24, is positioned by the platform in substantial parallelism with the line of zero-lift AB of the wing section of the craft in all flight conditions. This inclination in the improved structure is obtained from the tilt angle of the platform 11, the axis 23 being inclined upwardly by the platform in substantial parallelism with the line AB in flight conditions where the Mach No. is less than 1.

The pitch pick-off of the gyro vertical is shown in the form of a selsyn signal transmitter whose rotor 25 is fixed to the case 22 and is energized from a suitable source of alternating current electrical energy. The stator 26 of this pick-off is fixedly mounted on gimbal ring 24. The pitch pick-off detects departure of the craft from the reference position provided by the gyro vertical about its minor or athwartship axis, the same providing a control signal for automatic pilot operation of the elevators 27 of the craft whose amplitude depends on the magnitude of the departure and whose phase depends on the sense of the departure. In order to prevent introduction of any pitch command signals to the elevators when the orientation of the gyro vertical relative to the root chord of the wing section of the craft is changed in accordance with the present inventive concepts, the elevator network of the improved automatic pilot includes a differential pick-off designated at 28, one of whose parts is fixed to the craft and the other of whose parts is fixed to the platform 11. The pitch pick-off is operatively connected to the differential pick-off 28 by way of lead 29.

The differential selsyn 28 is so connected with the platform 11 and frame 14 of the craft that any signal generated by the pitch pick-off 25—26 due to an adjustment of the platform 11 under the operation of motor 16 will be zeroed by the differential selsyn 28. In other words, the relatively rotatable portions of the differential selsyn 28 will be moved through the same angle as the platform 11 and can therefore be arranged so that no pitch signal is generated simply because the motor 16 adjusts the platform 11 through some angular displacement. Hence, any adjustment of platform 11 occasioned by lowering the flaps or in response to the output of a Mach number-measuring device, will result in no signal being applied to the elevator servo system.

Other elements of a conventional nature in the elevator control channel of the improved automatic pilot include a manually settable pick-off 30 operatively connected to differential pick-off 28 through suitable leads 31, an amplifier 32, a servomotor 33 and repeatback synchro or generator 34. As shown, the servomotor 33 is connected to the elevators by suitable shafting, the input to the motor being obtained from amplifier 32 which is connected to the settable rotor of the pick-off 30. Synchro or generator 34 provides conventional repeatback regulation for the servomotor 33, the rotor of the same being positioned in accordance with the displacement of the elevators 27 from a trim condition. Leads 35 connect the synchro 34 and amplifier 32.

The illustrated angle (*i*) corresponds to the angle between the zero-lift line and the wing root chord and has a fixed value in the gyro vertical shown and described in the noted Brannin patent. With angle (*i*) constant, the elevator control channel functions in the same manner as taught by Brannin to maintain the craft at a constant altitude during turns by operation of the elevators. In accordance with the present invention, motor 16 positions the platform 11 so that the illustrated angle (*i*) is maintained during flight of the craft with the control surfaces thereof such as conventional spoilers or landing flaps in a normal or up condition. The control surfaces illustrated are in the form of flaps which are designated at 36. As shown, the flaps may be moved to a down position for landing or maneuvering purposes by means such as a motor 37 energized from an alternating current source of electrical energy by way of leads 38 through a suitable controlling mechanism 39. Motor 37 is operatively connected to the flaps by suitable shafting. The motor 37, also by way of the shafting, positions the rotor of a signal means or generator 40 whose stator provides an input by way of leads 41 and two position switch 42 to the input leads 19 of amplifier 18. With the flaps in the up position there is zero output from the generator 40 and the motor 16 is inoperative. The motor 37 and connections thereto provide a means for lowering the flaps or operating the control surfaces 36 of the craft to effectively modify the position of the line of zero-lift of the wing section thereof. With mechanism 39 properly set, motor 37 operates to lower the flaps and generator 40 sends an input signal to amplifier 18 that causes the motor 16 to operate in accordance with the relation shown in Fig. 2 between angle (*i*) and Mach number for the flap conditions noted as 20, 40, 60, 80 and 100 percent flaps. The broken line curve in this figure indicates the limit of the respective noted flap condition curves along the Mach number axis. The graph also shows that the positive value of "*i*" increases for a given relatively low craft speed within the limit determined by the locus curve as the flaps are lowered to a 100 percent flap down condition. The flap percentages designated represent relative degrees of operation of the flaps between a flaps up or no flaps condition and a 100 percent or flaps down condition. Generator 40 provides a means for measuring effective changes in the position of the line of zero-lift of the wing section of the craft. Motor 16 and platform 11 provide a means for causing a corresponding change in the inclination of the major axis of the gyro vertical relative to the wing root chord of the craft, such means being operated by the change measuring means. When the flaps are raised, the signal generator 40 operates to cause motor 16 to restore the tilt platform to its positive angle (*i*) illustrated in Figs. 1, 2 and 3.

During conditions of operation of the craft with speeds approximating, at or above the speed of sound, the location of the zero-lift line AB is materially changed due to the compressibility and aeroelasticity of the wing section. Under such conditions the sign of the angle AOM changes from positive to negative, as shown in Fig. 2. To change the angle (*i*) correspondingly under such conditions, I utilize a suitable Mach No. measuring device indicated at 43 with a pick-off (not shown) whose output, in accordance with the relation shown by the full line curve in Fig. 2 for a no flap flight condition of the craft, is fed by way of leads 44, through switch 42 located in its down position, as viewed in Fig. 3, to amplifier 18 to cause the required operation of motor 16. As the angle (*i*) is adjusted negatively in accordance with the present inventive concepts, the motions of the platform 11 with pick-off 28 thereat and gimbal ring 24 with pick-off 25 thereat are viewed equally by the respective pick-offs. Consequently, the change in orientation of the platform relative to the craft wing root chord does not introduce any erroneous pitch command signals to the elevator controls by reason of the adjustment. In accordance with the no flap condition curve in Fig. 2, the angle "$i$" changes from a positive to a negative value at a point below Mach number 1. Angle "$i$" remains negative as the speed of the craft increases above Mach 1.

The operation of the present system may be more fully appreciated from the following considerations. Let us first assume that the vertical gyro 10 defines a vertical reference and that the longitudinal axis of the aircraft on which it is mounted lies normal to the vertical and therefore the gimbal axis of the gyro, coincident with the longitudinal axis of the craft, also lies normal to the vertical reference. Under these conditions the craft may rotate about its longitudinal axis without producing any component of that movement in pitch relative to the gyro. Hence, there will be no pitch signal derived from the gyro under such conditions. However, if the casing of the gyro vertical or the axis of support for the gyro gimbal were to be tilted relative to the aircraft, then a pure rolling movement of the craft about its longitudinal axis, such as is occasioned by banking of the craft, will result in a pitch signal because there will be a component of movement of the gyro casing about the pitch axis as it is moved in roll. This is so because the axis of the gimbal ring of the gyro as represented by the platform 11, shown in Fig. 3, has been tilted relative to the axis about which the roll action takes place. It will be noted that the amount of pitch signal derived in this manner will depend upon the angle of inclination of the gimbal axis and the angle of bank of the craft. Therefore, in accordance with the present invention, the inclination of the platform 11 is changed to provide a pitch signal correctly dependent upon roll attitude of the craft when the inclination of the zero-lift line is changed due to, for example, flap lowering and the like and the gimbal axis is preferably maintained positioned substantially parallel to the zero-lift line of the aircraft wing such as that represented by the line AOB in Fig. 1. Under these circumstances when the aircraft flies straight and level, even though, for example, the flaps may be lowered, there will be no pitch signal derived from the pitch pick-off of the gyro vertical 10. However, when the craft is banked to make a turn, a pitch signal will be derived depending upon the bank angle of the craft, increasing the climbing attitude of the craft to such an extent as to maintain constant altitude.

The rudder and aileron automatic pilot controlling channels shown herein are of a conventional nature, the same being illustrated to provide a complete showing of an automatic pilot. The elements provided for controlling the rudder include a directional gyroscope 45, an azimuth pick-off 46, a course setting pick-off 47 connected to pick-off 46, an amplifier 48 operated by the output of pick-off 47 and a servomotor 49 connected through suitable shafting to the rudder 50. Synchro or generator 51, like synchro 34, provides a repeatback signal to amplifier 48 for regulation of the rudder servomotor 49. The aileron controlling elements include a roll pick-off 52 at the gyro vertical, a manually settable pick-off 53, an amplifier 54 connected to the rotor of pick-off 53 and a servomotor 55 connected by suitable shafting to the ailerons 56. Synchro or generator 57, like synchros 34 and 51, connected to amplifier 54 operates to provide the required repeatback regulation for the aileron servomotor 55.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an aircraft automatic pilot having a gyro vertical with its major axis inclined upwardly in substantial parallelism with the line of zero-lift of the wing section of the craft, the combination of means providing an effective measure of changes in the position of the line of zero-lift of the wing section with respect to the wing root chord of the craft, and means operated by said effective change measuring means for causing a corresponding change in the inclination of the major axis of the gyro vertical relative to the wing root chord of the craft.

2. An automatic pilot for aircraft with flaps having a gyro vertical with its major axis inclined upwardly in substantial parallelism with the line of zero-lift of the wing section of the craft, means for lowering the flaps of the craft to effectively change the position of the line of zero-lift of the wing section with respect to the wing root chord, and means responsive to said flap lowering means for causing a corresponding change in the inclination of the major axis of the gyro vertical relative to the wing root chord of the craft.

3. An aircraft automatic pilot having a gyro vertical with its major axis inclined upwardly in substantial parallelism with the line of zero-lift of the wing section of the craft, a Mach No. measuring device providing an effective measure of changes in the position of the line of zero-lift of the wing section with respect to the wing root chord of the craft, and means operated by said device for causing a corresponding change in the inclination of the major axis of the gyro vertical relative to the wing root chord of the craft.

4. In an aircraft automatic pilot, a control device comprising a platform tiltable about the athwartship axis of the craft, a gyro vertical mounted on said platform having its major axis normally inclined upwardly by the platform in substantial parallelism with the line of zero-lift of the wing section of the craft, means for moving said tilt platform about its axis to modify the inclination of the major axis of the gyro vertical, and means for operating said moving means in accordance with an effective measure of changes in the position of the line of zero-lift relative to the wing root chord of the craft.

5. The combination claimed in claim 4, in which said device includes a pitch pick-off at the gyro-vertical and a differential pick-off operatively connected to said pitch pick-off having an element fixed to the craft and an element fixed to the tilt platform.

6. An automatic pilot for aircraft with elevators having a platform tiltable about the athwartship axis of the craft, a gyro vertical mounted on said platform having its major axis normally inclined upwardly by the platform in substantial parallelism with the line of zero-lift of the wing section of the craft, means providing an effective measure of effective changes in the position of the line of zero-lift of the wing section with respect to the wing root chord of the craft, means operated by said effective change measuring means for correspondingly changing the tilt of said platform relative to the wing root chord of the craft, a pitch pick-off at said gyro vertical, and a servomotor operatively connected to the elevators controlled by the output of said pitch pick-off.

7. An automatic pilot for aircraft with elevators and flaps having a platform tiltable about the athwartship axis of the craft, a gyro vertical mounted on said platform having its major axis normally inclined upwardly by the platform in substantial parallelism with the line of zero-lift of the wing section of the craft, means for lowering the flaps of the craft to effectively change the position of the line of zero-lift of the wing section with respect to the wing root chord, means responsive to said flap lowering means for correspondingly changing the tilt of said platform relative to the wing root chord of the craft, a pitch pick-off at said gyro vertical, and a servomotor operatively connected to the elevators controlled by the output of said pick-off.

8. An automatic pilot for aircraft with elevators having a platform tiltable about the athwartship axis of the craft, a gyro vertical mounted on said platform having its major axis normally inclined upwardly by the platform in substantial parallelism with the line of zero-lift of the wing section of the craft, a Mach No. measuring device providing an effective measure of changes in the position of the line of zero-lift of the wing section with respect to the wing root chord of the craft, means operated by said device for causing a corresponding change in the tilt of said platform relative to the wing root chord, a pitch pick-off at said gyro vertical, and a servomotor operatively connected to the elevators controlled by the output of said pitch pick-off.

9. An automatic pilot for aircraft with elevators and a control surface operable to change the effective position of the line of zero-lift of the wing section relative to the wing root chord of the craft, a gyro vertical having its major axis normally inclined upwardly in substantial parallelism with the line of zero-lift of the wing section of the craft, means for adjusting the inclination of the major axis of the gyro vertical, means for operating said control surface, signal means controlled by said operating means, and means operatively connected to said signal means for operating said adjusting means to cause a corresponding change in the inclination of the major axis of the gyro vertical relative to the wing root chord of the craft.

10. The combination in an automatic pilot for aircraft with a wing root chord, of, a platform tiltable about an axis athwartship of the craft, a gyro vertical mounted on said platform having a major axis normally inclined upwardly by the platform in angular relation to the wing root chord of the craft, a pick-off at the minor axis of the gyro vertical, a differential pick-off operatively connected to said minor axis pick-off having an element fixed to the craft and an element fixed to the tilt platform, and tilt adjusting means for said platform operable to vary the angular relation between the major axis of the gyro vertical and the wing root chord of the craft.

References Cited in the file of this patent

UNITED STATES PATENTS 2,553,546     Brannin _____ May 22, 1951